United States Patent [19]

Chambers

[11] 4,348,063
[45] Sep. 7, 1982

[54] BALL BEARING SLIDE
[75] Inventor: William I. Chambers, Wichita, Kans.
[73] Assignee: NCR Corporation, Dayton, Ohio
[21] Appl. No.: 219,758
[22] Filed: Dec. 23, 1980
[51] Int. Cl.³ .......................................... F16C 29/06
[52] U.S. Cl. .................... 308/3.8; 308/6 C; 312/339
[58] Field of Search .................... 308/3.6, 3.8, 6 C; 312/337, 339, 340, 341 R, 341 NR, 343, 344

[56] References Cited

U.S. PATENT DOCUMENTS

| | | | |
|---|---|---|---|
| 1,938,908 | 12/1933 | Hunter | 312/339 |
| 3,035,873 | 5/1962 | Fall | 308/3.8 |
| 3,059,978 | 10/1962 | Fall | 308/6 C |
| 3,326,616 | 6/1967 | Levenberg | 312/341 |
| 3,485,539 | 12/1969 | Fall et al. | 308/3.8 |
| 3,488,097 | 1/1970 | Fall | 308/3.8 |
| 3,557,721 | 1/1971 | Worm | 108/143 |
| 3,687,505 | 8/1972 | Fall et al. | 308/3.8 |
| 3,712,690 | 1/1973 | Fall | 308/3.8 |
| 3,743,366 | 7/1973 | Tazaki | 308/3.8 |
| 3,778,120 | 12/1973 | Hagen et al. | 308/3.8 |
| 3,911,835 | 11/1975 | Schill | 108/87 |
| 3,950,040 | 4/1976 | Fall | 308/6 C |
| 4,067,632 | 1/1978 | Sekerich | 312/341 R |
| 4,077,677 | 3/1978 | Sekerich | 308/3.6 |
| 4,089,568 | 5/1978 | Fall | 308/3.8 |
| 4,095,854 | 6/1978 | Teramachi | 308/3.8 |
| 4,119,377 | 11/1978 | Barber et al. | 312/344 |
| 4,145,093 | 3/1979 | Sekerich | 308/3.8 |
| 4,200,342 | 4/1980 | Fall | 308/3.8 |

FOREIGN PATENT DOCUMENTS

| | | | |
|---|---|---|---|
| 561719 | 11/1957 | Belgium | 312/339 |
| 548474 | 1/1923 | France | 312/339 |

*Primary Examiner*—Richard R. Stearns
*Attorney, Agent, or Firm*—J. T. Cavender; Albert L. Sessler, Jr.; Elmer Wargo

[57] ABSTRACT

A slide assembly having first, second, and third track members, with the third track member being positioned between the first and second track members. The third track member has first and second U-shaped channels extending along the length thereof, with the first and second U-shaped channels having the associated open sides thereof facing the first and second track members, respectively. The first track member has first bearing means secured thereto to engage the first U-shaped channel in bearing relationship therewith, and the second track member has second bearing means secured thereto to engage the second U-shaped channel in bearing relationship therewith to enable the second and third track members to be extended and retracted with respect to the first track member.

5 Claims, 9 Drawing Figures

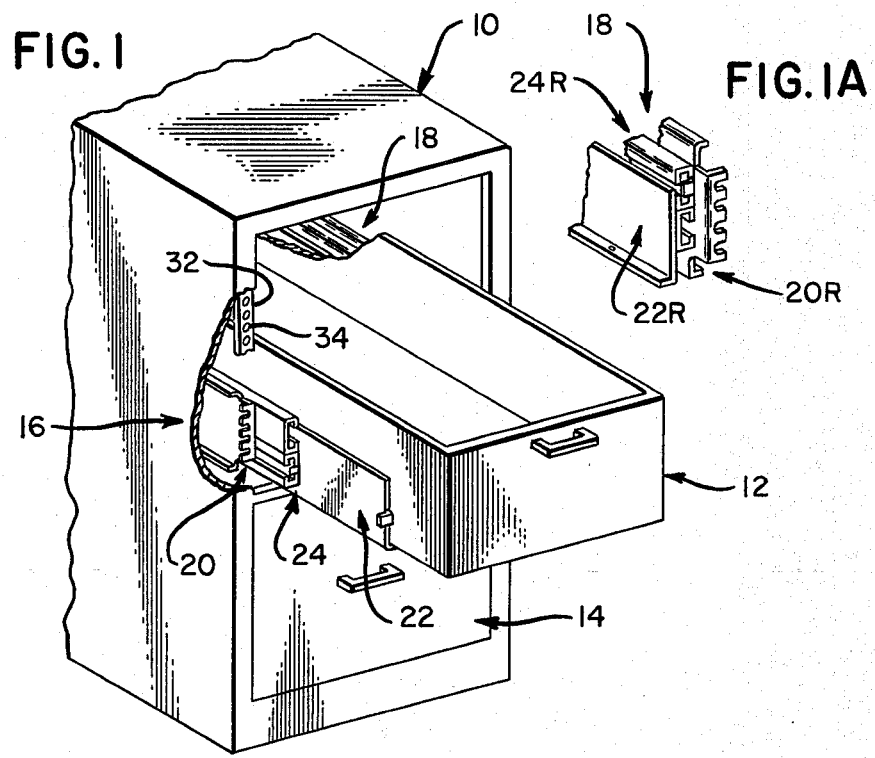
FIG. 1
FIG. 1A
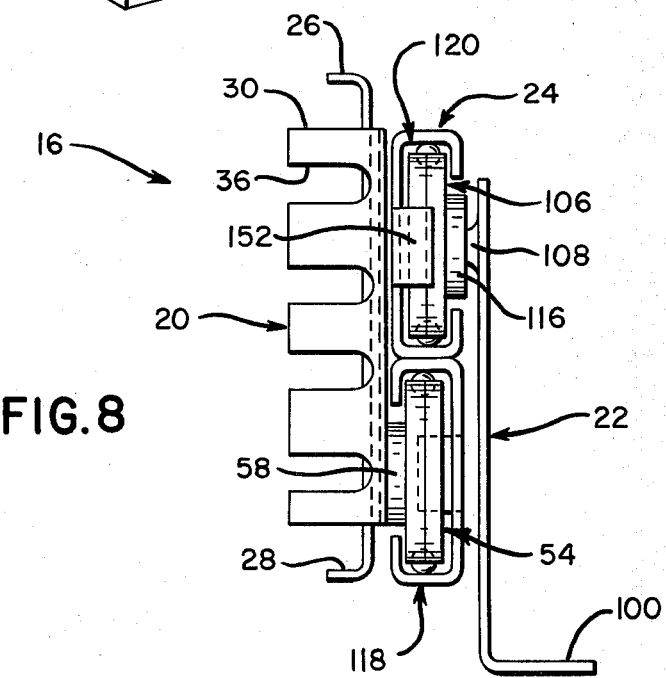
FIG. 8

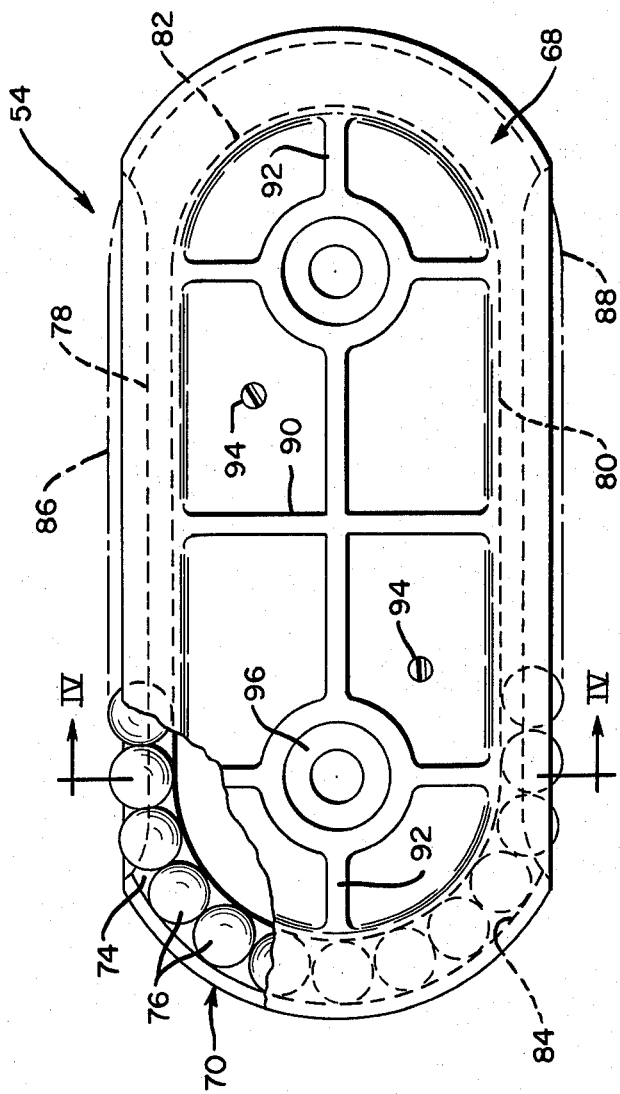
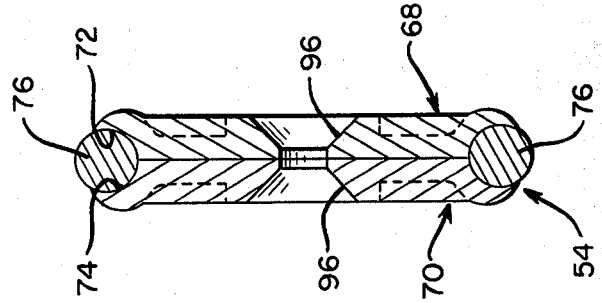

BALL BEARING SLIDE

BACKGROUND OF THE INVENTION

This invention relates to a ball bearing slide, and more specifically it relates to a slide assembly which enables a drawer or electronic chassis, for example, to be extended and retracted with respect to an associated cabinet.

Many types of ball bearing slides are available for slidably supporting a drawer or electronic chassis for movement out of an associated cabinet to enable the contents of an electronic chassis, for example, to be examined. Thereafter, the chassis is retracted into the cabinet. Some types of slides are expensive to manufacture, and complicated to assemble.

SUMMARY OF THE INVENTION

This invention relates to a slide assembly which comprises: first, second, and third track members, with the third track member being positioned between the first and second track members; means for attaching the first track member to a support member; the third track member having first and second U-shaped channels extending along the length thereof, with the first and second U-shaped channels having the associated open sides thereof facing the first and second track members, respectively; the first track member having first bearing means secured thereto to engage the first U-shaped channel in bearing relationship therewith; and the second track member having second bearing means secured thereto to engage the second U-shaped channel in bearing relationship therewith to enable the second and third track members to be extended and retracted with respect to the first track member.

A feature of this invention is that its very simplified design permits a low manufacturing cost. Another feature is that the slide assembly is compact and it also uses circulating ball tracks which support a drawer or electronic chassis in both top load and bottom load conditions.

These features or advantages and others will be more readily understood in connection with the following specification, claims, and drawing.

BRIEF DESCRIPTION OF THE DRAWING

FIG. 1 is a general view, in perspective, of this invention as it is used for supporting a drawer for movement out of and into a cabinet, showing principally, a slide assembly for supporting the left side of a drawer as viewed in FIG. 1;

FIG. 1A is a view, in perspective, showing a slide assembly in a fully retracted position for supporting the right side of a drawer as viewed in FIG. 1;

FIG. 3 is an enlarged, plan view of a bearing member used in this invention for providing a circulating track for the ball bearings retained therein;

FIG. 4 is a cross-sectional view, taken along the line IV—IV of FIG. 3 to show additional details of the bearing member shown in FIG. 3;

FIG. 8 is an end view of the slide assembly shown in FIGS. 1 and 2 when viewed from the direction A in FIG. 2.

DETAILED DESCRIPTION OF THE INVENTION

Figure 2:
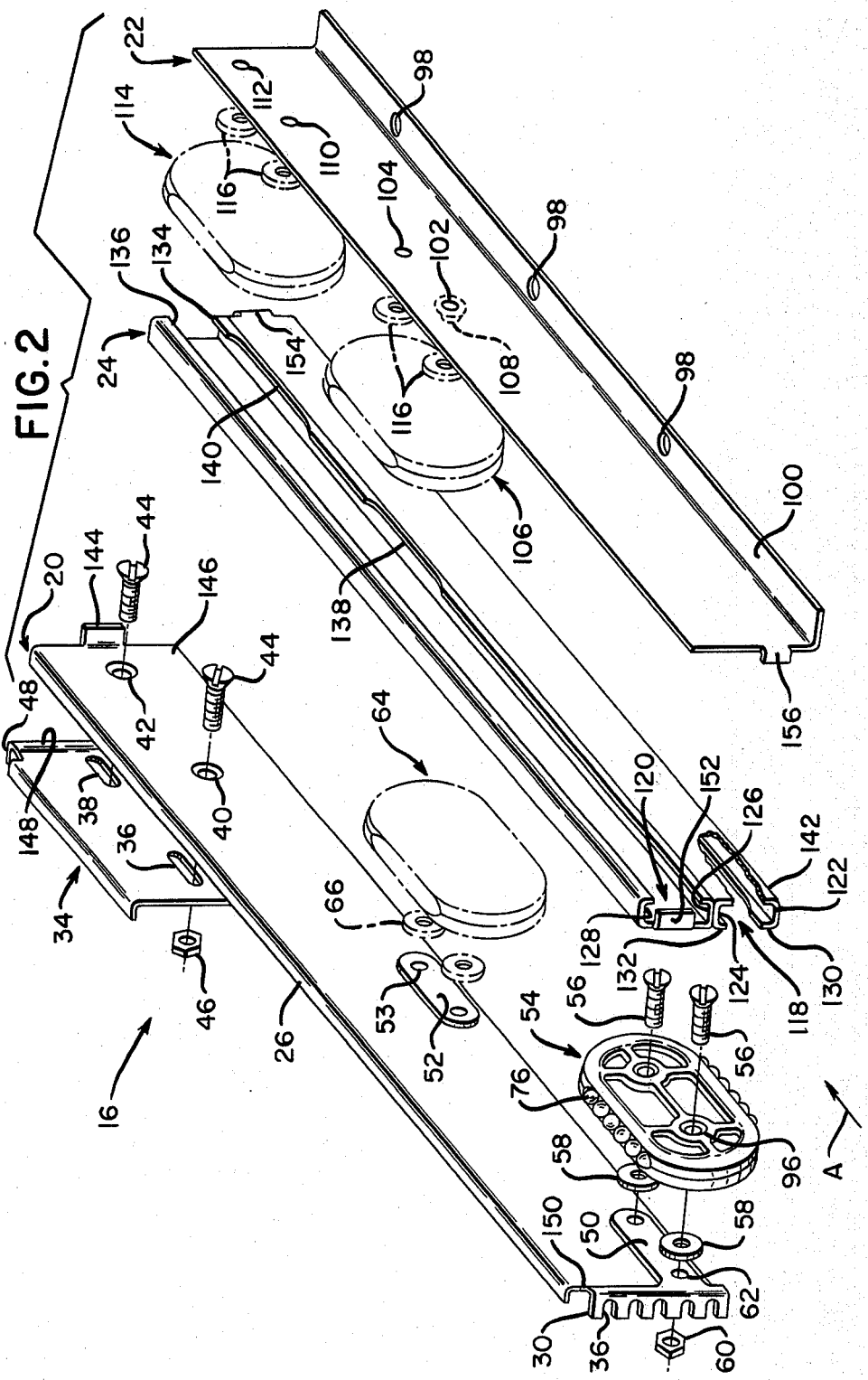
FIG. 2 is an exploded view, in perspective, showing first, second, and third track members comprising the slide assembly shown in FIG. 1 with the slide assembly being in a fully retracted position.

FIG. 1 is a general view, in perspective, of a cabinet 10 having drawers 12 and 14 therein. Each drawer like 12 is supported in the cabinet 10 by slide assemblies 16 and 18 which comprise the subject matter of this invention. The assemblies 16 and 18 support the associated drawers in an extended position as is shown by drawer 12 and also support the drawers in a fully retracted position as is shown by drawer 14. The drawer 12 is shown in reduced height in FIG. 1 so as to facilitate a showing of the assemblies 16 and 18.

While the assemblies 16 and 18 (FIG. 1) are shown in cooperative relationship with a drawer like 12 for ease of illustration, it is understood that the assemblies 16 and 18 may be used, for example, for similarly supporting an electronic chassis (not shown). The slide assemblies 16 and 18 are especially useful in supporting such an electronic chassis because they can support heavy loads and they provide a low rolling friction to enable the heavy loads to be moved with a small force. For example, with a load of approximately 180 pounds, a pulling force of about 5 pounds is necessary to start the drawer 12 rolling towards the fully extended position from a retracted position, and thereafter, a pulling force of about 3 pounds is necessary to keep the drawer 12 moving outwardly of the cabinet 10. The maximum pushing force to start the drawer 12 moving from a fully extended position towards the retracted position is about 17 pounds. Naturally, these pulling and pushing force values given in this example are merely illustrative and could vary depending upon a particular application of this invention.

The slide assemblies 16 and 18 (FIG. 1) are identical in construction; however, the assembly 18 is a mirror image of the assembly 16. Consequently, only slide assembly 16 will be discussed in detail.

The slide assembly 16 (FIG. 1) is shown in exploded view, in perspective, in FIG. 2. The assembly 16 includes a first track member 20 which is secured to the cabinet 10, a second track member 22 to which a drawer like 12 or an electronic chassis may be secured, and a third track member 24 which is positioned between the first and second track members 20 and 22, respectively, as shown.

The first track member 20 has the generally elongated, planar shape best shown in FIG. 2 and is provided with flanges 26 and 28 (FIG. 8) to provide structural rigidity to the member 20. The front end of the member 20 (as viewed in FIG. 2) has a slotted portion 30 which cooperates with an apertured mounting rail 32 (FIG. 1) to adjustably locate and fix the first track member 20 within the cabinet 10. Suitable fasteners (not shown) pass through a selected hole like 34 (FIG. 1) in the rail 32 and a selected slot like slot 36 in the slotted portion 30 to secure the front end of the first track member 20 to the cabinet 10. The mounting rail 32 may be a standard EIA (Electrical Industrial Applications)

rail which is used with the electronic chassis mentioned earlier herein.

Figure 5:
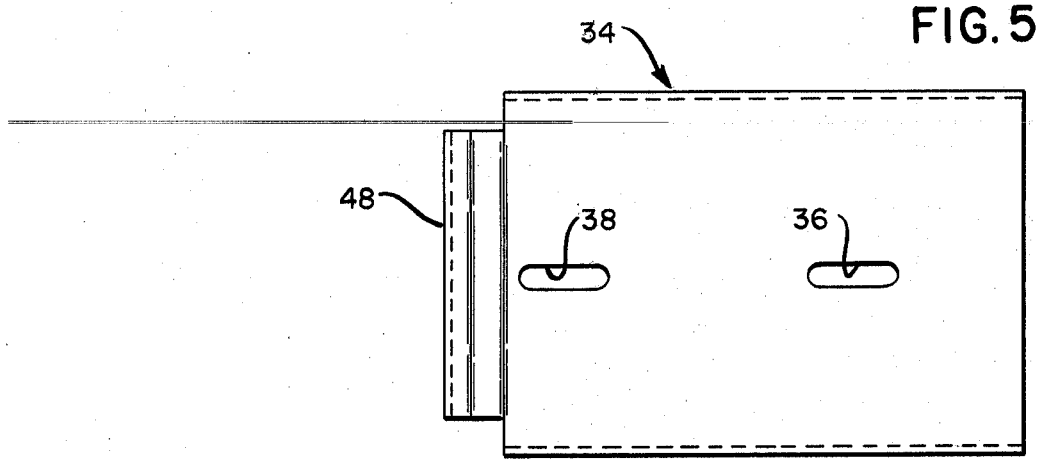
FIG. 5 is an elevational view of a member which provides an adjustable means for mounting one end of the slide assembly of this invention in an associated cabinet or support means.
Figure 6:
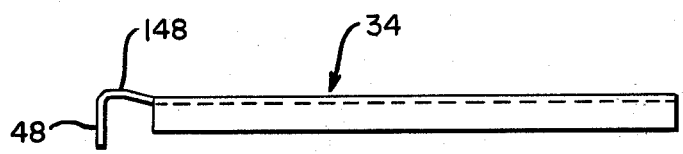
FIG. 6 is a bottom view of the member shown in FIG. 5.
Figure 7:
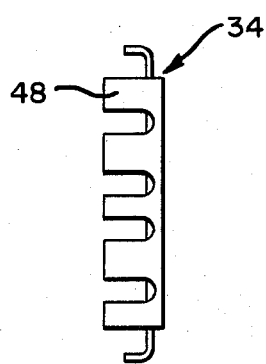
FIG. 7 is an end view of the member shown in FIGS. 5 and 6.

The rear end of the first track member 20 (as viewed in FIG. 2) has a means for adjusting the length thereof and for mounting the member 20 within the cabinet 10; this includes an extension 34 which is shown in more detail in FIGS. 5, 6, and 7. The extension 34 has elongated slots 36 and 38 therein which are aligned with the holes 40 and 42, respectively, in the first track member 20 to enable the length of the member 20 to be adjusted within the cabinet 10. Suitable fasteners 44, passing through the holes 40 and 42 and the slots 36 and 38, respectively, in conjunction with their associated nuts 46, adjustably secure the extension 34 to the member 20. The extension 34 has a slotted portion 48 on the end thereof to enable the extension 34 to be secured to a mounting rail (not shown) which is similar to rail 32 in FIG. 1.

The first track member 20 (FIG. 2) has two raised areas or bosses 50 and 52 which have the elongated shape shown. The bearing member 54 is shown in a greatly enlarged size in FIG. 2 to facilitate a showing thereof; however, its actual size approximates that of the size of the boss 50. The bearing member 54 is positioned on the boss 50 and is secured to the first track member 20 by the fasteners 56, spacers 58, and the nuts 60. The boss 50 has suitable holes 62 therein to enable the associated fastener 56 to pass therethrough. The boss 52 has a bearing member 64 which is positioned thereover and secured to the first track member 20 in the same manner as already described in relation to bearing member 54. The bearing member 64 is identical to bearing member 54 and is shown in phantom outline merely to simplify the drawing. The bearing member 64 has the associated spacers 66 which are identical to spacers 58 already described. The relationship of the bearing members 54 and 64 to the remaining elements in the slide assembly 16 will be described hereinafter.

The bearing member 54, shown in FIG. 2, is shown in more detail and in enlarged form in FIGS. 3 and 4. The bearing member 54 is comprised of first and second identical plates 68 and 70 which have facing recesses 72 and 74 (FIG. 4) therein, respectively, to form a closed circulating path for the ball bearings 76. The circulating path provides linear movement for the ball bearings 76 at areas 78 and 80, and curved or circumferential movement at areas 82 and 84. The ball bearings 76 are retained totally within the plates 68 and 70 at the areas 82 and 84 (FIG. 3) and they are partially exposed at areas 78 and 80 of the circulating path to provide an upper bearing surface shown by the line 86 and a lower bearing surface shown by the line 88. These bearing surfaces 86 and 88 cooperate with the third track member 24 as will be described hereinafter. When the ball bearings 76 are partially exposed to form the bearing surfaces 86 and 88, they are still sufficiently enveloped by the plates 68 and 70 so as to retain them therebetween as is best seen in FIG. 4.

The plates 68 and 70 (FIGS. 3 and 4) are made as aluminum die castings in the embodiment described, although other materials may be used. Aluminum die castings are generally cheaper than steel castings for the plates 68 and 70, and with ten ball bearings 76 comprising each of the bearing surfaces 86 and 88, the plates 68 and 70 are adequately strong for the loads involved in the particular application of the invention described. The plates 68 and 70 have ribs like 90 and 92 to provide for maximum rigidity of the plates 68 and 70 while using a minimum of material. The plates 68 and 70 may be assembled with the ball bearings 76 therebetween and are retained in the assembled relationship shown in FIGS. 3 and 4 by small fasteners 94 to facilitate the mounting of the bearing members 54 and 64 on the first track member 20, for example. The plates 68 and 70 have countersunk holes therein like hole 96 in plate 68 (FIG. 4) to provide a flush construction after the associated fastener 56 is inserted therein. In the embodiment described, the ball bearings 76 are made of steel and have a diameter of 3/16 inch, and they have a total spacing of half the width of one ball bearing 76 when they are inserted in the closed circulating loop formed by recesses 72 and 74 within the bearing member 54.

The second track member 22 (FIG. 2) is the member of the slide assembly 16 to which a drawer like 12, electronic chassis, or other item is secured. The second track member 22 has a flange 100 to provide rigidity thereto with holes such as 98 to enable the drawer 12 to be secured thereto, and it also may be used in supporting the drawer 12.

The second track member 22 (FIG. 2) has holes 102 and 104 therein to receive fasteners (not shown but similar to fasteners 56) which secure the associated bearing member 106 to the second track member 22. Because the member 22 is made of relatively-thin sheet metal, thereis not sufficient thickness of metal within the holes 102 and 104 to provide an adequate area for threading. Consequently, the second track member 22 is extruded in the area of the holes 102 and 104 to provide an "increased thickness" as at area 108 which permits an adequate amount of threading to be formed therein to enable the bearing member 106 to be secured to the second track member 22; the same is true for holes 110 and 112 and the associated bearing member 114. The bearing members 106 and 114 are shown in phantom outline in FIG. 2 to simplify the drawing; however, they are identical to bearing member 54 already described. These bearing members 106 and 114 have their associated spacers 116 which are identical to spacers 58.

The third track member 24 is positioned between the first track member 20 and the second track member 22 as shown in FIG. 2, and it operatively cooperates with them to enable the drawer 12 to be extended and to be retracted as shown by drawer 14 in FIG. 1. The third track member 24 is comprised of two U-shaped channels, with the first U-shaped channel 118 facing the first track member 20 and with the second U-shaped channel 120 facing the second track member 22. The second channel 120 is positioned over the first channel 118 as shown, and these channels move in an imaginary plane which is parallel to the planes of the first and second track members 20 and 22, respectively. The first channel 118 has first and second linear bearing surfaces 122 and 124 which extend along the length of the third track member 24. The ball bearings 76 of the bearing member 54 at bearing surface 88 (FIG. 3) are in rolling engagement with the first bearing surface 122 of the first channel 118, and similarly, the ball bearings 76 of the the bearing surface 86 (FIG. 3) are in rolling engagement with the second bearing surface 124 of the first channel 118. Bearing member 64 (FIG. 2) cooperates with the first channel member 118 in the same manner as does bearing member 54.

The bearing members 106 and 114 (FIG. 2) cooperate with the second U-shaped channel 120 in the same manner as that already described in relation to bearing members 54 and 64 and the first channel member 118; consequently, further explanation is not deemed necessary. The second U-shaped channel 120 has opposed first and second linear bearing surfaces 126 and 128 which extend along the length of the third track member 24.

The first and second U-shaped channels 118 and 120 are made of sheet metal in the embodiment described, and they are spot welded together to form a rigid construction comprising the third track member 24. The first U-shaped channel 118 has first and second leg portions 130 and 132 extending at right angles from the associated bearing surfaces 122 and 124, respectively, as shown in FIG. 2; these leg portions 130 and 132 prevent the track assembly 16 from coming apart when the assembly 16 is subjected to a lateral thrust or a thrust which is perpendicular to the motion of a drawer like 12 when it is being extended from the cabinet 12. In the embodiment described, the track assembly like 16 can withstand a lateral thrust or side pressure of 250 Newtons or approximately 56.4 pounds. The second U-shaped member 120 also has first and second leg portions 134 and 136 extending therefrom for the same purpose as just described. The second U-shaped channel 120 also has portions removed from the first leg portion 134 at areas 138 and 140 to facilitate the entry of the bearing members 106 and 114, respectively, during the assembly of the slie assembly 16.

The slide assembly 16 (FIG. 2) is assembled in the following manner. The extension 34 is adjusted on the first track member 20 so that it has the appropriate length to fit between the associated mounting rails like 32 shown in FIG. 1, and thereafter, the nuts 46 (FIG. 2) are tightened to secure the extension 34 to the first track member 20. With the first track member 20 removed from the cabinet 10, the bearing members 54 and 64 are then secured to the first track member 20 as previously explained. The bearing member 54 is secured tightly, but the bearing member 64 is left loosely secured to the track member 20 to facilitate the assembly of the third track member 24 on to the first track member 20.

The third track member 24 (FIG. 2) is assembled with the first track member 20 by sliding the loosely-mounted, bearing member 64 into the front end 142 of the first U-shaped channel 118 so that the bearing member 64 is retained therein, and thereafter sliding the front end 142 over the bearing member 54. After the first and second track members 20 and 24 are so assembled, the nuts (like 60) for the bearing member 64 are tightened to firmly secure the bearing member 64 to the first track member 20. A bent over portion or stop 144 on the rear end 146 of the first track member 20 prevents the third track member 24 from moving out of engagement with the first track member 20 when the third track member 24 is moved (from an extended position) towards the rear end 146 of the first track member 20. The first track member 20 (with the third track member 24 mounted thereon) is then secured in the cabinet 10 as previously described. The extension 34 has an offset portion 148 therein as shown in FIG. 6. The slotted portion 30 shown in FIG. 2 has a similar offset portion 150. The offset portions 148 and 150, the bosses 50 and 52, and the spacers like 58 and 66 are utilized to provide a clearance between the first and third track members 20 and 24, respectively, to prevent them from contacting each other. In normal fabrication, the first track member 20 is not exactly planar; therefore, the construction mentioned in the previous sentence obviates the unwanted contact between the first and third track members 20 and 24.

After the first and second track members 20 and 24 (FIG. 2) are mounted in the cabinet 10 as described, the second track member 22 is positioned in the cabinet 10 so that the bearing members 106 and 114 are aligned with the areas 138 and 140 in the third track member 24. Thereafter, the second track member 22 is rotated slightly in a counerclockwise direction (as viewed in FIG. 2) so that the tops of bearing members 106 and 114 are moved behind the leg portion 136 of the second channel 120, and thereafter, the lower end of the second track member 22 is rotated in a clockwise direction to move the bearing members 106 and 114 over the areas 138 and 140, respectively, into the second channel 120. The third track member 24 has a bent over portion forming a stop 152 which limits the extent to which the second track member 22 will move towards the extended position relative to the third track member 24. The third track member 24 also has a stop 154 (similar to stop 152) at the rear end thereof to limit the movement of the third track member 24 towards the extended position relative to the first track member 20 by having the stop 154 abut against the bearing member 64. Also, the second track member 22 has a stop 156 on the front end thereof to push the third track member 24 towards the retracted position when the slide assembly 14 is moved towards that position from the extended position.

FIG. 8 shows the assembled relationship of the first, second and third track members 20, 22, and 24, respectively, and is taken from the direction "A" shown in FIG. 2.

The slide assembly for the right side of the cabinet 10 as viewed in FIG. 1 is shown in FIG. 1A and is designated generally as 18. The slide assembly 18 is composed of the first, second, and third track members 20R, 22R, and 24R, respectively; they are similar to track members 20, 22, and 24 as previously stated but they are mirror images of them. The slide assembly 18 is assembled in the same manner as already explained with regard to slide assembly 16. After the slide assemblies 16 and 18 are located within the cabinet 10, the drawer 12 (in the embodiment described) is then secured to the associated first track members 22 and 22R.

The hole 102 in the second track member 22 is located approximately at the midpoint of the length thereof, and correspondingly, the hole 53 in the first track member 20 is located approximately at the midpoint of its assembled length; this enables the third track member 24 to move out of the cabinet 10 for about half its length relative to the first track member 20, and correspondingly, the second track member 22 moves for about half its length relative to the third track member 24.

In the embodiment described, the first, second, and third track members like 20, 22, and 24 are made of at least 16 gauge steel sheet metal, although a thickness of 0.075 inch for these members seemed to provide more rigidity to meet the lateral thrust specification mentioned.

I claim:
1. A slide assembly comprising:
first, second, and third track members, with said third track member being positioned between said first and second track members;
means for attaching said first track member to a support member;
said third track member having first and second U-shaped channels extending along the length thereof, with said first and second U-shaped channels having the associated open sides thereof facing said first and second track members, respectively;

said first track member having first bearing means secured thereto to engage said first U-shaped channel in bearing relationship therewith; and said second track member having second bearing means secured thereto to engage said second U-shaped channel in bearing relationship therewith to enable said second and third track members to be extended and retracted with respect to said first track member;

each said first and second bearing means comprising recirculating ball bearings in said bearing relationship;

said first bearing means comprising first and second spaced-apart, bearing units; and each of said first and second spaced-apart bearing units comprising:

first and second plates facing each other and also being shaped to form an endless recirculating track therebetween, with said recirculating ball bearings being located in said endless recirculating track;

each of said endless recirculating tracks having first and second straight portions located on opposed sides thereof, with said recirculating ball bearings located in said first and second straight portions providing said bearing relationship with said first U-shaped channel.

2. The slide assembly as claimed in claim 1 in which said second bearing means comprises third and fourth spaced-apart, bearing units;

each of said third and fourth bearing units comprising:

third and fourth plates facing each other and also being shaped to form an endless recirculating track therebetween, with said recirculating ball bearings being located in said endless recirculating track.

3. The slide assembly as claimed in claim 2 in which said first, second, and third track members are substantially planar and said second and third track members move in second and third planes, respectively, which said second and third planes are parallel to said first track member.

4. The slide assembly as claimed in claim 3 in which said first and second U-shaped channels lie substantially in said third plane.

5. The slide assembly as claimed in claim 4 in which said first and second U-shaped channels each have first and second legs extending towards each other so as to retain the associated said first and second bearing means, respectively, therein when said slide assembly is subjected to a lateral force when at least one of said first and second track members is at least partially extended with respect to said first track member.

* * * * *